UNITED STATES PATENT OFFICE.

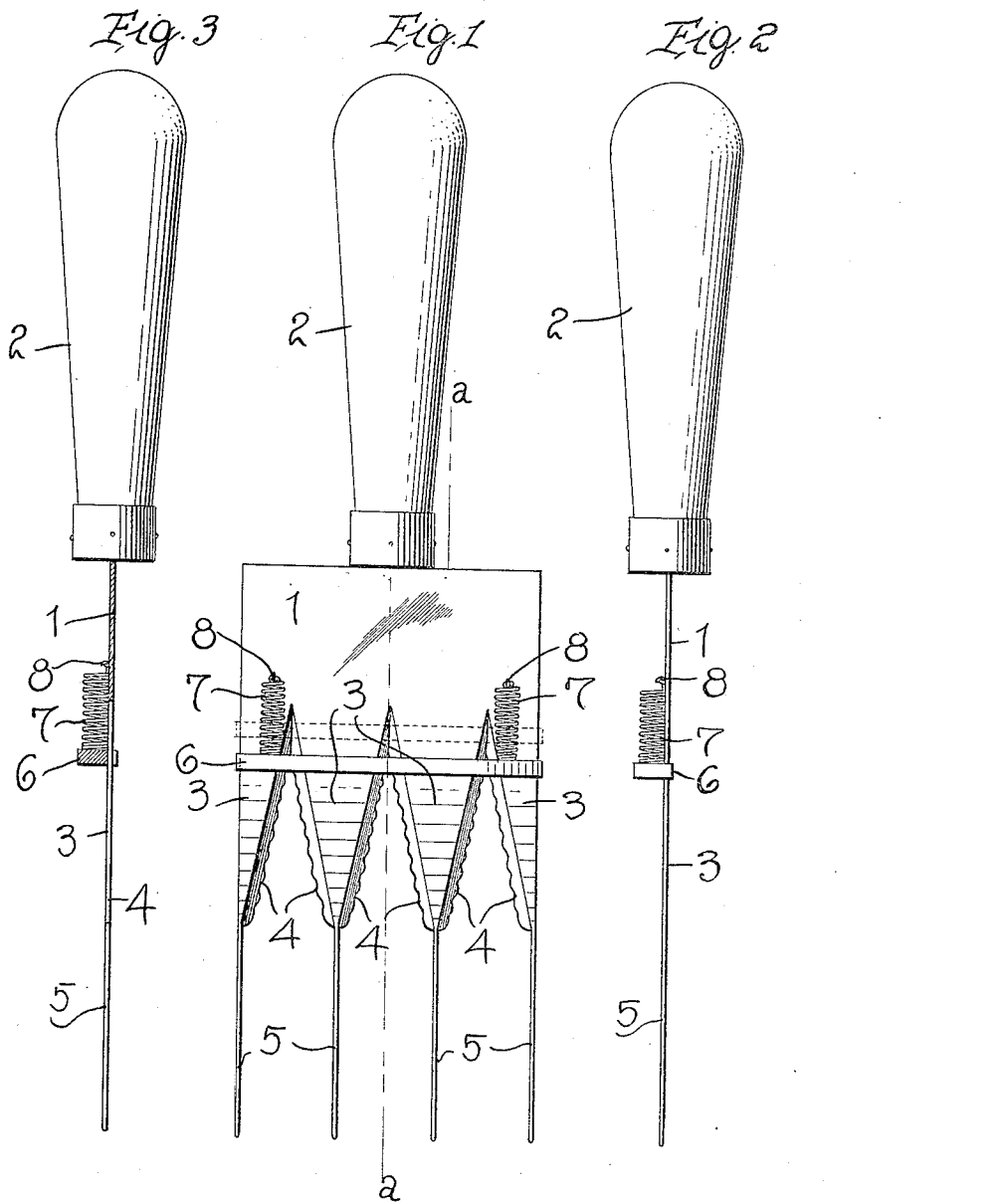

CYRUS S. HINDERLITER, OF HESPERIA, MICHIGAN.

BEAN-HARVESTER.

1,133,474.  Specification of Letters Patent.  Patented Mar. 30, 1915.

Application filed September 21, 1914. Serial No. 862,778.

*To all whom it may concern:*

Be it known that I, CYRUS S. HINDERLITER, a citizen of the United States, residing at Hesperia, in the county of Oceana and State of Michigan, have invented certain new and useful Improvements in Bean-Harvesters, of which the following is a specification, reference being had to the accompanying drawings.

My invention relates to a new and useful improvements in bean harvesters and has for its object to provide a harvester especially adapted for hand use, and which shall be simple and inexpensive of construction and provided with means for preventing the clogging of the stripping knives.

It also has for an object to adapt the harvester for use not only as such but also as a forker in order that in one trip over a bean field the beans may be pulled and forked at the same time, thus saving both time and labor.

With these ends in view my invention consists in the details of construction and arrangement hereinafter more particularly described and illustrated in the accompanying drawing in which Figure 1 is a plan view of my improved harvester. Fig. 2 is a side elevation of the same, and Fig. 3. a vertical section taken on the line *a—a* of Fig. 1.

Similar reference numerals indicate like parts in the several figures of the drawing.

1 represents the body of the harvester composed preferably of sheet steel and formed with a suitable shank to which is secured in any suitable manner a handle 2. The gage of the sheet steel is such as to give the desired rigidity to the structure and it is formed with a series of converging and diverging stripping knives the adjacent edges of which are waved and sharpened as shown at 4 for the purpose presently explained.

From the lower extremity of the knives there are extended fork tines 5 as best shown at Fig. 1.

6 is a transverse bar embracing both sides of the blades 3 and held in position by coil springs 7, one end of each of which is secured to the upper edge of the bar 6 and the opposite end to the body at 8 in any suitable manner so that the bar is held in the position shown at Fig. 1 below the intersection of the converging blades 3.

Having described the construction of my improved harvester I will now describe the manner in which it is used. Being grasped by the handle 2 the blades are thrust into the bean vines which are gradually forced between the converging waved edges of the knives 3 and severed, the transverse bar yielding and assuming the position shown in dotted lines in Fig. 1 and in such movement the coil springs 7 are obviously put under compression, so that when the harvester is removed from the vines for a second operation, the recoil of the springs 7 will force the bar 6 down to its normal position and thus strip the blades of any bean vines which might otherwise clog the blades at their junctures. After the bean vines have been severed and fall upon the field they may then be forked into cocks or piles by the tines 5, thus rendering unnecessary the use of any other instrument or machine or the employment of an additional laborer.

While I have described the preferred material to be used, it will be understood that this may be varied, and that likewise other details may be varied without departing from the spirit of my invention as manifested in the claims.

What I therefore claim as new and desire to secure by Letters Patent is:—

1. A hand bean harvester comprising a body provided with a handle and formed with converging cutting blades, said blades having extended therefrom fork tines substantially as hereinbefore set forth.

2. A hand bean harvester of the character described comprising a flat body, a handle from which the body projects, the rear edge of the body abutting against the end of the handle, the body being formed with a plurality of converging cutting edges.

3. A hand bean harvester comprising a body provided with a handle and converging cutting blades, a transverse stripping bar overlying the cutting blades, and springs connected at one end to the bar and at the opposite end to the body of the harvester whereby to urge said stripping bar outward.

4. A hand bean harvester comprising a flat relatively thin body having a handle rigidly connected thereto and projecting from one end thereof, the body being formed to provide a plurality of converging cutting edges on the end opposite the handle, and an outwardly urged stripping member supported upon the body for movement lengthwise of the body.

5. A hand bean harvester comprising a flat relatively thin body formed to provide a plurality of cutting blades, the edges of said blades having converging cutting edges, said blades having fork tines extended therefrom, and a stripping member slidably mounted upon the body for movement lengthwise thereof, said stripping member extending across the blades, and springs urging the stripping member toward the ends of the blades.

In testimony whereof I hereunto affix my signature in the presence of two witnesses.

CYRUS S. HINDERLITER.

Witnesses:
WM. BUNNELL,
FRANCIS BUNNELL.

Copies of this patent may be obtained for five cents each, by addressing the "Commissioner of Patents, Washington, D. C."